United States Patent
Vukovic et al.

(10) Patent No.: US 7,269,152 B2
(45) Date of Patent: Sep. 11, 2007

(54) METHOD AND APPARATUS FOR TRANSMITTING INFORMATION WITHIN A COMMUNICATION SYSTEM

(75) Inventors: Ivan Vukovic, Arlington Heights, IL (US); Thomas A. Freeburg, Arlington Heights, IL (US); Paul Odlyzko, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 86 days.

(21) Appl. No.: 10/366,860

(22) Filed: Feb. 14, 2003

(65) Prior Publication Data

US 2004/0160916 A1 Aug. 19, 2004

(51) Int. Cl.
*H04Q 7/00* (2006.01)

(52) U.S. Cl. ...................... 370/332; 370/348
(58) Field of Classification Search ................ 370/280, 370/314, 468; 455/296, 63.1, 67.11
See application file for complete search history.

(56) References Cited

U.S. PATENT DOCUMENTS

| | | | | |
|---|---|---|---|---|
| 3,911,432 | A * | 10/1975 | Williams | 342/59 |
| 5,157,709 | A * | 10/1992 | Ohteru | 455/465 |
| 5,355,522 | A * | 10/1994 | Demange | 455/62 |
| 5,987,018 | A | 11/1999 | Freeburg et al. | |
| 6,272,353 | B1 * | 8/2001 | Dicker et al. | 455/517 |
| 6,496,700 | B1 * | 12/2002 | Chawla et al. | 455/435.2 |
| 6,639,541 | B1 * | 10/2003 | Quintana et al. | 342/18 |
| 6,888,805 | B2 * | 5/2005 | Bender et al. | 370/314 |
| 6,895,245 | B2 * | 5/2005 | Wallentin | 455/436 |
| 6,930,993 | B1 * | 8/2005 | Hamada et al. | 370/347 |
| 6,983,165 | B1 * | 1/2006 | Hiramatsu | 455/522 |
| 2001/0053695 | A1 * | 12/2001 | Wallentin | 455/436 |
| 2004/0137849 | A1 * | 7/2004 | Kloper et al. | 455/67.11 |
| 2004/0156345 | A1 * | 8/2004 | Steer et al. | 370/338 |
| 2004/0203474 | A1 * | 10/2004 | Miller et al. | 455/69 |

FOREIGN PATENT DOCUMENTS

GB 2234142 A * 1/1991

OTHER PUBLICATIONS

Silventoinen et al.; Radio Resource Management in a Novel Indoor GSM Base Station System; 1997 IEEE.*
Fernando et al.; A Viterbi-Like Algorithm with Adaptive Clustering for Channel Assignment in Cellular Radio Networks; 2002.*

* cited by examiner

*Primary Examiner*—Hassan Kizou
*Assistant Examiner*—Salman Ahmed

(57) ABSTRACT

A node within a communication system periodically broadcasts its interference status to neighboring nodes within the communication system. Additionally, the node receives an interference status from all neighboring nodes. If communication is desired with a neighboring node, the node accesses the stored table for the particular neighboring node and determines an optimal time for transmission to the neighboring node. This is accomplished by utilizing the table received from the neighboring node and determining the neighboring node's optimal times for reception.

13 Claims, 9 Drawing Sheets

| LOCATION NUMBER | 1 | 2 | 3 | 4 | 5 | 6 | 7 | 8 | ••• |
|---|---|---|---|---|---|---|---|---|---|
| BUSY/IDLE | B | B | I | I | I | B | B | I | |
| ACCESSIBLE /INACCESSIBLE | IA | IA | A | A | A | A | IA | IA | |
| CONNECTION PROCESS NUMBER | 1 | 1 | – | – | – | – | 2 | – | |

METHOD AND APPARATUS FOR TRANSMITTING INFORMATION WITHIN A COMMUNICATION SYSTEM

FIELD OF THE INVENTION

The present invention relates generally to communication systems and in particular, to a method and apparatus for transmitting information within such communication systems.

BACKGROUND OF THE INVENTION

Referring to FIG. 1, two sets of communicating units are illustrated, each set functioning as an independent network. These networks are illustrated as networks 10 and 11 comprising a first set (set A) of nodes or units as well as a second set (set B) of nodes or units. Four units of the first set are shown as units 12, 14, 15 and 16. One unit of the second set is shown labeled 13. Each unit may be referred to as "terminal" or a "node". Each unit 12, 13, 14, 15, 16 may be a fixed or portable data terminal, or a fixed or portable two-way radio, or indeed a video telephone or other communicating unit. The units 12, 13, 14, 15, 16 will simply be referred to hereafter as "radio units". Each set of radio units consists of two or more radio units communicating with each other. While any member of one set may interfere with the transmissions of one or more members of the other set (and any further sets not illustrated), it is possible, indeed probable, that any given radio unit may not be able to directly receive the transmissions of such other radio units that it may interfere with or that may interfere with it, thereby making conventional methods for avoiding interference as listen-before-talk (carrier sense) ineffective.

Interference often hinders performance of communication systems. One type of interference often encountered by a user within a communication system is interference generated by the transmissions of other users. This is typically caused by many users transmitting within the same frequency band, and referred to as co-channel interference. In order to reduce co-channel interference many communication systems employ a frequency reuse pattern, where adjacent transmitters transmit on different frequencies. However, given the price of spectrum, future communications systems will be characterized by aggressive frequency reuse patterns that will result in significantly increased levels of co-channel interference.

In order to reduce co-channel interference, the "Listen-before-transmit (LBT)" etiquette has been formulated in the past in decentralized RF environments to enable non-interoperable systems to share spectrum. In such systems a node defers from transmitting if the received power is above some predefined threshold during a time period in which the node was to transmit. One assumption of a LBT system is that overlapping transmissions will almost certainly jam each other. This is approximately correct in the case of user devices simultaneously attempting to access a base station, but is definitely not true in peer-to-peer communications between disjoint pairs of nodes, where there is little correlation between the RF power detected by the node that intends to transmit on the channel and the interfering power impacting the intended receiver. The effect is that the would-be transmitters often unnecessarily refrain from transmitting some of the time and at other times may transmit when the intended receivers are jammed by interference.

This fact has been partly addressed in the proposed SAMA (Simple Asynchronous Multiple Access) etiquette discussed in U.S. Pat. No. 5,987,018, where the initial transmission called a Probe is sent to the intended receiver in a chosen time slot. If the receiver receives the Probe it will send an ACK (CTS—Clear-to-Send) to the transmitter indicating that the chosen time slot is acceptable. The reception of both the Probe and the ACK is the indication to the transmitter that it can continue using the slot it originally chose. It should be noted that the term slot does not imply any synchronization between radio nodes but is more a convenient term for a specific time interval inside the frame. The functioning of the SAMA etiquette is shown in FIG. 13.

As illustrated in FIG. 13, Node A sends a probe to Node B. If, Node B receives the probe, and if Note B determines it is a desired location for reception of Node A's transmission, then Node B will send a CTS message to Node A indicating that Node A should continue transmitting within that particular location. If the Probe or CTS is not successful in reaching its destination, a new Probe is sent at another point inside the frame and the process is repeated. The frame is a fixed time interval agreed by all participating SAMA nodes. SAMA etiquette purposely leaves it open to the designer's choice to decide when the Probe/CTS should be sent. One mentioned option is to use LBT. From these attempts, it was proposed that each node create a table of accessible and inaccessible slots. Even though this technique does improve upon LBT etiquette, it still presents a problem in that multiple attempts to communicate with a node may be made to build the table, and to determine an appropriate location for transmission. These multiple probes contribute to system interference. Therefore, a need exists for a method and apparatus for transmitting information within a communication system that improves upon the LBT etiquette, yet does not generate the interference caused by the existing SAMA etiquette.

DETAILED DESCRIPTION OF THE DRAWINGS

Figure 1:
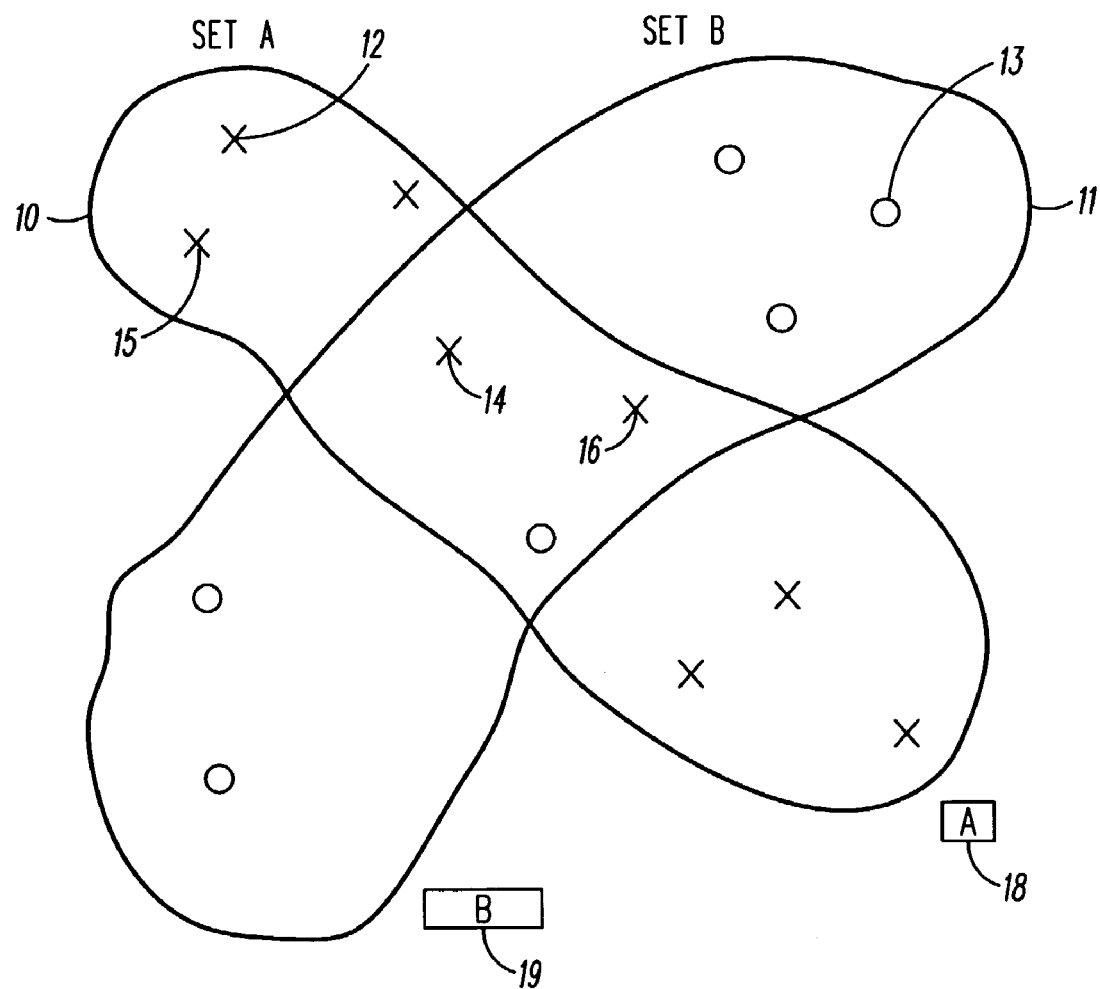
FIG. 1 is a geographical map representation of two overlapping communications networks.

In order to address the above-mentioned need, a method and apparatus for transmitting information within a communication system is disclosed herein. A node within the communication system periodically broadcasts its interference status to neighboring nodes within the communication system. Additionally, the node receives an interference status from all neighboring nodes. If communication is desired with a neighboring node, the node accesses the stored table for the particular neighboring node and determines an optimal time for transmission to the neighboring node. This is accomplished by utilizing the table received from the neighboring node and determining the neighboring node's optimal times for reception. Because a node no longer has to build a table using multiple access attempts to determine an appropriate location for transmission, system interference is reduced.

In the communication system of the preferred embodiment of the invention, it is assumed that a basic channel will carry video, speech and data transmissions, all by cells carrying a "payload" of a predetermined number of octets. All nodes are aware of the frame duration. All transmissions are generally asynchronous (do not require synchronization between the clock of a sender and the clock of a receiver) and are of a fixed size (the meaning of which and the exception to which are described below to allow for varying data speeds). Addressing is carried out in a fixed-size header, that is not fixed by time, frame position or other fixed characteristic. Each wireless cell includes a sequence number and an error detecting code. Cell generation rates may be negotiated and are in general variable.

The present invention encompasses a method for transmitting information. The method comprises the steps of monitoring for interference to determine an interference state comprising those time periods when a node can receive communications within the frequency band with little or no interference. A table is created comprising the node's interference state and broadcasted to neighboring nodes within the communication system.

The present invention additionally encompasses an apparatus comprising a processor monitoring for interference within a frequency band and outputting a table comprising an interference state, memory for storing the table, and a transmitter, for transmitting the table to neighboring nodes within the communication system.

All transmissions are considered elements in persistent circuits. A channel can be considered as divided into frames and the start and end of a frame need not be synchronized across the system, provided that each two communicating units operate to the same frame length. The frame length is preferably predetermined for the system, but this is not essential. Access by a radio unit to a frame location (slot) implies access to the corresponding locations of subsequent frames. After the location has been chosen, using an algorithm described below, the radio unit listens for an acknowledgement. The transmitting node uses the same time slot in the next frame when the acknowledgement is received or abandons the time slots for which the acknowledgement was not received. These slots, which may be referred to as inaccessible slots, are not accessed again for at least a predetermined time-out period, for example 30 frames.

It is preferred, but not essential, that a basic pre-determined frame rate is provided for all units in the system. All transmissions are at integer multiples or divisors of the frame rate (FR). If no basic frame rate is established for a system, two communicating units must establish their own frame rate.

In an aspect of the invention, a method of operation of a communications system 10 is provided comprising a plurality of radio units 12, 14, 15 and 16, the method comprising: establishing a basic frame rate for all radio units in the system; commencing two-way communication between any two radio units of the plurality of radio units by transmitting data units from a first radio unit 12 to a second radio unit 14 at a cell rate which is an integral multiple or an integral divisor of the basic frame rate.

The cells are preferably all of equal length across the system, but this is not essential, provided at least that they are of fixed size (equal length) for the duration of a communication established between two units. Queuing advantages are reduced if cells of different sizes are contending for access to the channel, but there are still advantages to be gained if there is a limited range of cell sizes and particularly if the available sizes are integer multiples of a basic cell size.

The method, in its preferred embodiment, further comprises: commencing two-way communication between a third radio unit 15 and a fourth radio unit 16 by transmitting cells from the third radio unit 15 to the fourth radio unit 16 at a cell rate which is an integral multiple or integral divisor of the basic frame rate and at times which are asynchronous with respect to data cells transmitted between the first radio unit 12 and the second radio unit 14.

In another aspect of the invention, communication system and method for communicating within the communication system is provided herein. In the preferred embodiment of the present invention the communication system comprises a frequency band with a plurality of users, all transmitting within the same frequency band. During communication from a first radio unit 12 to a second radio unit 14, the first radio unit 12 will receive a "table" of available slots transmitted from the second radio unit 14. The table indicates those slots where the second radio unit 14 receives little, or no interference from others transmitting within the frequency band. During transmission from radio unit 12 to radio unit 14, radio unit 12 will utilize the table received from radio unit 14 when determining an appropriate slot for transmitting data to radio unit 14.

The physical medium for the communication is a radio channel, of which the frequencies, bandwidth, modulation and other aspects are entirely selectable for the circumstances and the spectrum available.

Figure 2:
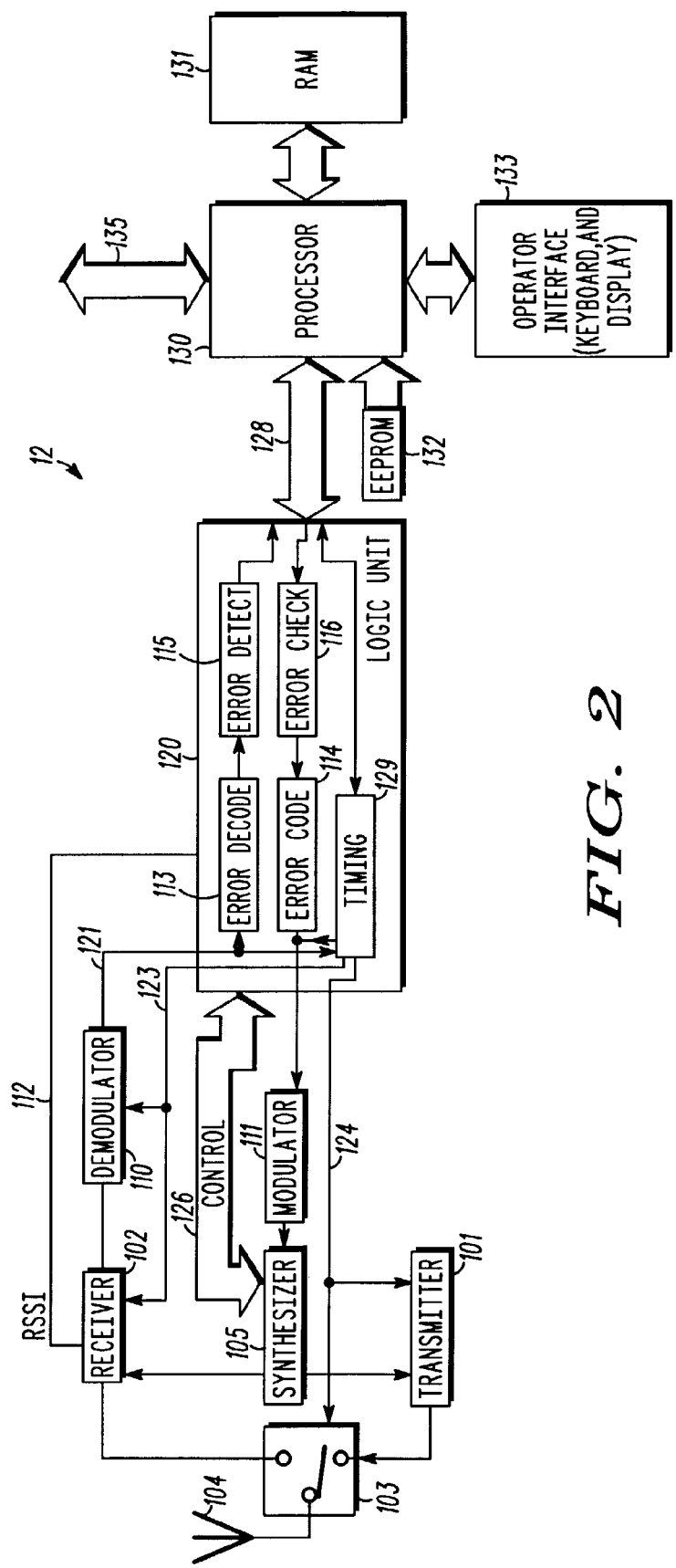
FIG. 2 is a block diagram of a radio unit operating in accordance with the present invention.

Referring now to FIG. 2, elements of an example of a radio unit 12 in accordance with the present invention are shown. The construction and operation of the other radio units 14, 15 and 16 of system 10 are identical and need not be described separately.

The radio unit 12 comprises a transmitter 101 and a receiver 102, both coupled to an antenna switch 103 and, through the antenna switch, to an antenna 104. A synthesizer 105 is coupled to each of the receiver 102 and the transmitter 101. A demodulator 110 is coupled to receiver 102. A modulator 111 is coupled to the synthesizer 105. A logic unit 120 is coupled via data lines 121 and 122 to the demodulator 110 and modulator 111, respectively, and is coupled by control lines 123 and 124 to the demodulator 110 and the receiver 102 and to the transmitter 101 and the antenna switch 103 respectively. A received signal strength indication (RSSI) line 112 passes from the receiver 102 to the logic unit 120, but this is optional. A control bus 126 is coupled between the logic unit 120 and the synthesizer 105. Logic unit 120 is shown, by way of example, as comprising an error decoding circuit 113, an error coding circuit 114, an error detect circuit 115, an error check generating circuit 116 and a timing circuit 129.

Coupled to the logic unit 120 via a digital bus 128 is a processor 130. Coupled to the processor 130 is a random access memory (RAM) 131, a program memory in the form of electrically erasable programmable read-only memory (EPROM) 132, an operator interface 133 such as a keyboard and display and an I/O interface 135.

In transmit operation, the processor 130 generates data cells (or receives these from the interface 135). Each data cell comprises a payload and a header. The processor 130 adds a SAMA field described below and supplies the resultant data to logic unit 120. In logic unit 120 error check generating circuit 116 adds a CRC error check, error coding circuit 114 generates additional cells of FEC coding and timing circuit 129 adds a synchronization word to each cell and controls the timing of outputting of the resultant transmission burst data to the modulator 111.

It will, of course, be appreciated that alternative arrangements can be provided. For example, circuit 116 can add its CRC error check after error coding by error coding circuit 114. Additionally, the data layer and higher layer processing can be performed by the logic unit 120. Alternatively, physical layer processing including the error coding and/or error check generation can be performed by the processor 130.

The logic unit 120 passes the data of each resultant transmission burst to the modulator 111 bit-by-bit and provides a transmitter key-up signal on control line 124 (at the same time switching antenna switch 103 to the lower position as shown). The timing circuit 129 controls the timing of key-up of the transmitter 101, so that each transmission burst is transmitted at a carefully selected time (slot) in a frame, as is described below.

When the transmitter 101 is not keyed up for transmission, the control line 124 causes the antenna switch 103 to switch to the upper position as shown, allowing data cells to be received via the antenna 104 to the receiver 102 and demodulated by the demodulator 110 and passed to the logic unit 120.

Timing circuit 129 derives bit timing from a received synchronization word at the start of each cell. Error decoding circuit 113 stores a copy of each received cells in preparation for error correction. Error decoding circuit 113 passes each cell without delay to error detect circuit 115, which verifies the validity of each cell based on its CRC error check. Each received and verified data cell is identified by a virtual circuit identifier (VCI) in a header of the cell (described below) and only cells received with the appropriate virtual circuit identifier are selected by the logic unit 120 for passing to the processor 130 for further processing. Where error detect circuit 115 is unable to verify a cell as validly received, the processor 130 is informed. Where a cell is not validly received, or even if a cell is totally lost in the reception, it can nevertheless be recovered by error decoding circuit 113 based on the error code received in preceding and following cells having the same VCI, where such cells exist. This is achievable because of the depth of error coding provided.

The processor 130 orders received data cells in the correct order as defined by sequence numbers in a cell field (described below). The processor 130 assembles the cell payloads for passing on to upper layers of the protocol, for presentation at the operator interface 133 or for outputting at the interface 135. As described the logic unit 120 performs physical layer processing, but higher layer processing can also be performed by logic unit 120, or physical layer processing (such as the error decoding function of error decoding circuit 113) can be performed by the processor 130.

Instead of an antenna switch 103, a duplexer can be used, allowing simultaneous receiving and transmitting of data cells. Logic unit 120 controls synthesizer 105 via control bus 126 to select appropriate frequencies for transmission and reception depending on the particular frequencies of the system and the modulation scheme and other aspects of the physical layer.

Figure 3:
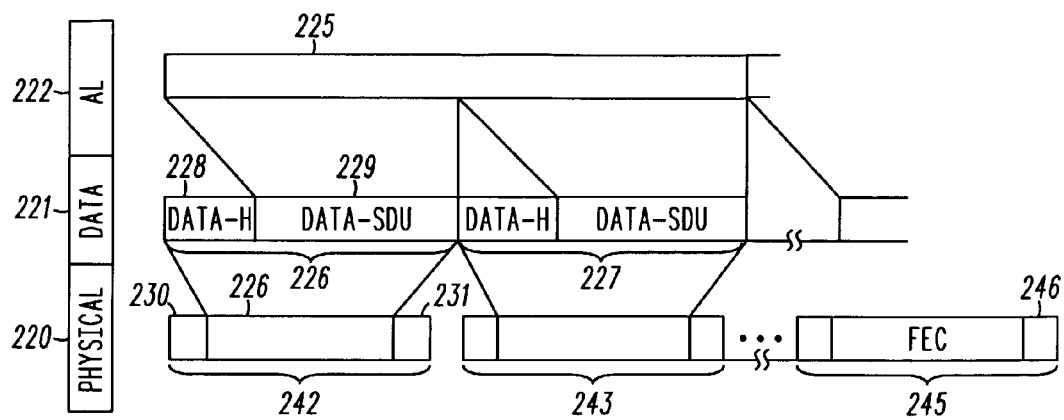
FIG. 3 is a protocol diagram illustrating layers of a data communication system in accordance with the present invention.

Referring to FIG. 3, an example of a protocol structure for wireless communication is illustrated. The protocol comprises a physical layer 220, a data layer 221 and an adaptation layer (AL) 222 as well as higher layers not shown, such as an inter-networking protocol (IP) layer and other protocol layers which need not be described here. The AL 222 takes data from a higher layer and optionally includes such features as forward error correction and segmentation and reassembly and it passes its data to the data layer 221 which accepts data from the AL 222 in SDUs of 48 octets each.

At the data layer, communication is in the form of data cells such as cells 226 and 227 illustrated. Each cell comprises a header 228 and an SDU 229. The header 228 comprises 5 octets and includes a virtual connection number (including a VPI and a VCI) as well as certain flow control bits and some error correction internal to the header. The virtual connection number is unique within a network to a particular virtual connection.

In the physical layer 220, a header with synchronization information 230 is added to a data cell 226 and a trailer 231 is added to make up a cell (or data unit) 242 for transmission as a single transmission burst, which is transmitted at a selected time over the radio channel. Instead of a trailer 231, the fields of trailer 231 can be included in a header with synchronization information 230. Note that the selected time can be considered local to the unit 12 as a "slot", but the division of the channel into frames is a matter of local timing. There is frame synchronization between communicating units but no frame synchronization between non-communicating units, and therefore no coordinated slotting structure to the channel. Similarly data cell 227 is formed into cell 243 for transmission on the channel either in another selected time in the same frame or in a later frame, but preferably cell 243 or every Nth cell following cell 242 is transmitted at the same time in each following frame, as is described below.

Also in the physical layer, one or more error coding cells 245 are added for a predetermined number (block) of data cells 226, 227. The error coding cell 245 contains FEC coding (or some other error coding). and has a trailer 246 similar to trailer 231. Note that in the preferred embodiment the trailer 246 is added before error coding, so that the whole of cell 245 is error coded, but trailer 246 (or at least an error check number included in trailer 246) can be added after error coding of the payload of cell 245.

Figure 4:
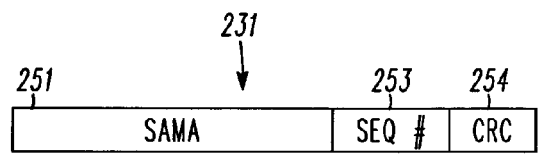
FIG. 4 is a protocol diagram showing details of a trailer of one of the layers of FIG. 3.

The trailer 231 is shown in greater detail in FIG. 4. It comprises (in the preferred embodiment) a SAMA field 251 for which the term "SAMA" is an abbreviation for "Simple" data Multiple Access'. The expression "simple" is used here to denote the ad-hoc nature of the multiple access protocol newly devised and is no more than a convenient label for referring to the field 251, which can be considered as a protocol sub-layer. The expression is useful for differentiating from a centralized data multiple access protocol, but it will be understood that many aspects of the invention are not limited to an ad-hoc protocol. SAMA field 251 carries a type identifier and a code rate indicator. The type identifier allows different types of cell, such as: data without acknowledgement (ACK); data with ACK; channel probe and "acknowledge and decline", and the broadcasting of a table indicating slots with little interference. If the type identifier identifies the cell as a channel probe cell, the SAMA field 251 further includes a message number.

The code rate identifier identifies the depth of the FEC coding—i.e. how many redundant FEC coding cells 245 there are in a coded block of data cells. For example, if the coding depth is 40% and there are 20 cells in a block, there are 8 cells out of every 20 cells that contain only FEC coding, but if the coding depth is 20% there will be only 4 cells of FEC coding in a block length of 20 cells. Note that it is not necessary for the trailer of every cell to include this information. It is sufficient that SAMA field 251 is able to support this information and optionally other types of information. The error coding is provided across sequential cells in a block. This allows a lost cell to be recovered from adjacent cells. The amount or "depth" of error coding is preferably selected by the processor 130 in a manner described below, but can be fixed. By way of example, a suitable depth of error coding is one that allows 3 cell out of about 15 or 18 cells to be recovered if completely lost. Further examples are given below.

Trailer 231 also has a sequence number 253 and has a CRC error check number 254. The sequence number has three purposes: it is used for cell re-ordering; it is used for error correcting; and it allows for a prompt NACK if more cells are lost than can be received. The CRC error check number 254 is added by the error check generating circuit 116 of FIG. 2 (or by the processor 130). The sequence number 253 allows a receiving radio unit to reassemble the cells in their correct sequence.

A virtual circuit can comprise one cell per frame or more than one cell per frame or less than one cell per frame.

The channel is organized into frames. The length of the frame is fixed but different sets of users (e.g. set A and set B of FIG. 1) can use different cell lengths (e.g. cells 18 and 19 respectively). A node or unit, e.g. unit 12, wishing to send a transmission burst makes a choice as to the time in its frame it will use to send a reservation request. In the preferred embodiment of the present invention this choice is made based on a received table indicating appropriate receive times of the receiving unit, e.g., unit 14. More particularly, a table is kept at each transmitter describing the interference state of all the receivers in the "neighborhood". This table is derived from Probe and CTS messages (containing the interference state) received from unit 14. Thus, listening to remote unit 14's Probe and CTS messages allows the transmitter 12 or any other listening node to learn about the reception state of receiver 14 at any moment during the frame (subject to necessary quantizing of time and received power levels). By knowing the reception state, transmitter 12 makes an appropriate choice when to transmit data to receiver 14.

A probe cell is the same as any other cell except for different information in the SAMA field 251, i.e. it contains regular data as well. The unit 12 then waits for an ACK (e.g. from unit 14) which approves the reservations of the attempted (probed) slot. The lack of the ACK denies the reservation and the accessed time must be abandoned and either a different time attempted or no link is established. If multiple time reservations are requested either a single ACK will be sent or multiple ACKs. The ACK is expected one frame period after the start time of the cell which carries the access request.

For example, consider a model in which the unit 12 divides one frame period into segments or slots of one cell duration each and consider that in this model slot numbers are assigned to the segments. Note that there is no start time or end time to a frame on the channel, so the slot numbering and timing is entirely local to unit 12. Let the calling unit 12 send probe cells in slots 2, 4 and 5, and let only ACK cells in slots 4 and 5 be received. In slot number 4 the ACK will arrive granting the reservations for slots 4 and 5. In slot number 5 the sending unit can start sending its cells. In the following frame both slots number 4 and 5 can be used.

Having thus established connection, the remote (called) unit 14 needs to send ACKs at some minimum rate which is related to the receive sequence numbers. The ACKs are sent in some of the reserved slots (in band) or some other slots (out-of-band). The former is more reliable but it consumes the bandwidth of the existing connection. The latter is not as reliable and it can lower the throughput by producing collisions with other connections and connection requests.

The radio unit 12 performs the step of: (a) forming data for transmission into data cells 226, 227 of equal length (the logic unit 120 forms these into cells 242, 243, 245 of equal length); (b) transmitting on the communication channel at a first selected time (e.g. slot 1) relative to a first frame (e.g. frame N) a first cell 242 comprising a field 251 having a first type identifier (probe cell identifier); (c) waiting for receipt of an acknowledgement of the first cell (in frame N+1); (d) retransmitting the first cell 242 including the first type identifier in a second selected time (e.g. slot 2) relative to a second frame (e.g. frame N+2) when an acknowledgement is not received; (e) repeating steps (c) and (d) with a different second selected time (e.g. slots 3, 4, 5 etc.) until an acknowledgement is received; and (f) sending a series of further cells 243, 245 of further data at times relative to later frames (e.g. frames N+3, N+4 etc.) corresponding to a selected time resulting from steps (b) to (e), each cell of the series of further cells comprising a field 251 with a second type identifier (data with or without ACK).

Expressed slightly differently, the following steps are performed: (a) selecting a selected time relative to a frame based on a received table; (b) transmitting on the communication channel at the selected time a first burst of data comprising a first type identifier; (c) waiting for receipt of an acknowledgement of the first burst; (d) when an acknowledgement is not received repeating step (a) with a different selected time and repeating steps (b) and (c) in a later frame, including retransmitting the first burst of data including the first type identifier, until an acknowledgement is received; and (e) sending a series of further bursts of further data at times relative to later frames corresponding to the selected time, each burst of the series of further bursts comprising a second type identifier.

A method of operating a first radio unit 12 is provided and has also been described comprising: forming data for transmission into cells 242, 243, 245 of equal length; transmitting a first cell 242 of data on the communication channel in a selected time in a first frame; waiting for receipt of an acknowledgement of the first cell; and, when an acknowledgement is received, sending a series of further cells (243, 245) of further data at times in later frames corresponding to the selected time, without the receipt of separate individual acknowledgement packets for individual cells. The first cell of data comprises a field 251 having a first type identifier (probe cell identifier); and each cell of the series of further cells has a field 251 comprising a second type identifier (data with or without ACK).

The corresponding receive operation comprises: receiving at the first radio unit 12 a first cell of data 242 on the communication channel in a first time in a first frame; transmitting an acknowledgement (not shown) to the second radio unit 14; receiving a series (e.g. a block or a complete message) of further cells 243, 245 of further data at times in later frames corresponding to the first time; and transmitting a single acknowledgement cell (not shown) from the first radio unit to the second radio unit following receipt of the series of further cells.

In practice there will be services that will require on average a fractional number of slots per frame. The integer part of the required number is chosen at the connection setup. During the course of time a transmission buffer will start building up. Based either on some threshold value for the queue length or the maximum tolerable delay of the cells, the connection process on the transmitting side may chose to request extra bandwidth. This is accomplished by sending a probe cell in an unreserved slot with some accessing probability. The remote end will respond with an ACK in the same slot of the next frame if the probe cell is received.

Whenever a connection that was using a group of slots runs out of cells the slots are released and can be used by other connections and units. In the releasing process the unit simply stops transmitting cells after ensuring previously that all the packets were received by the destination. Note here that connection closing does not mean that the whole session is over. It only means that the current message or block that was using a set of slots has been successfully transmitted.

Figure 5:
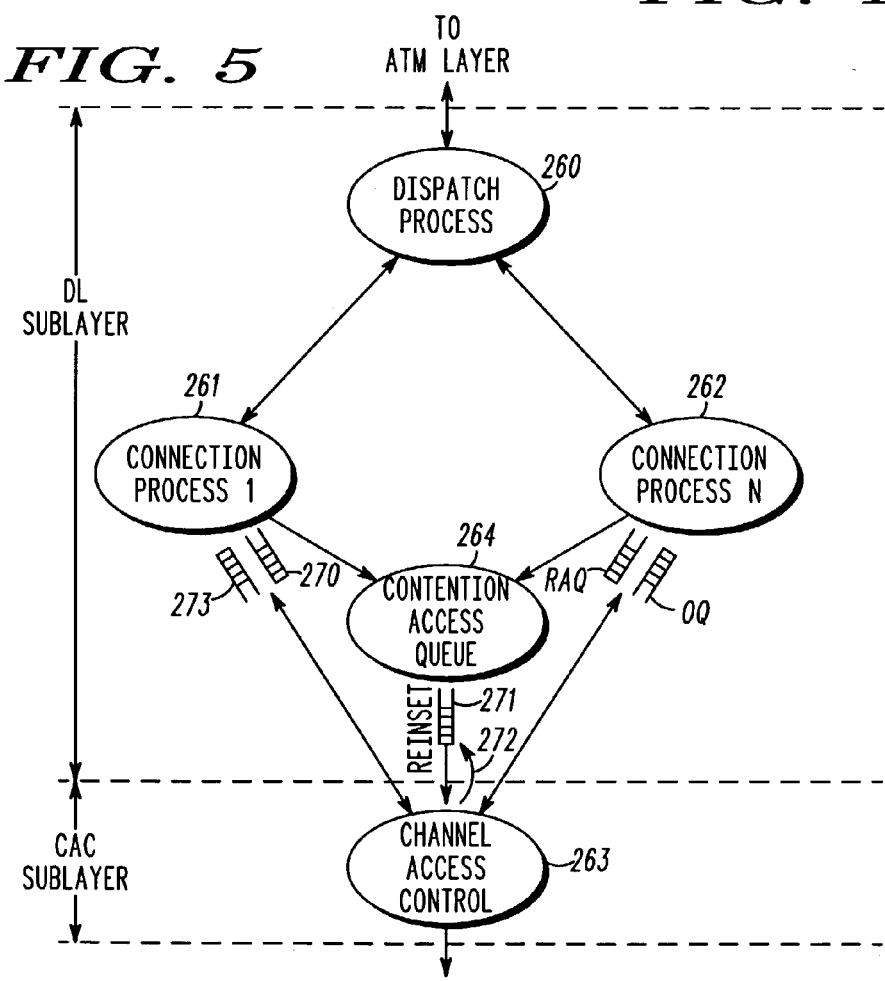
FIG. 5 is a flow diagram illustrating operation of certain processes in the radio unit of FIG. 2.

FIG. 5 illustrates sub processes performed by processor 130 of FIG. 2. Identical processes are performed at each of two communicating units, e.g. units 12 and 14. The figure shows a dispatch process 260 communicating with the data layer 221, first and second connection processes 261 and 262, a channel access control process 263 and a contention access queue process 264. Process 261 is labeled "connection process 1" and process 262 is labeled "connection process n" indicating that there is one such process for each connection established. Each such process handles two-way flow of data.

Each process 261, 262 (and further connection processes) contains an outgoing reserved access queue (RAQ) 270 formed in RAM 131, where the messages are queued for the CAC 263 to service them. Each connection process communicates with at least one remote peer process at the communicating unit. All connections have the same functionality.

Functions of the dispatch process 260 are: receiving data cells from the data layer 221 and dispatching them to the appropriate connection process. Functions of the connection processes 261 and 262 are buffering each data cell 226, 227 before submitting them to the CAC process 263; receiving data cells 226, 227 from the CAC process 263 and delivering them to the data layer 221 in sequence without loss. If some cells are received out of sequence they are buffered before the cells with the lower sequence numbers are received.

Based on the information stored in the header of each data cell from the data layer 221, the dispatch process 260 distributes the data cells to their corresponding connection processes as shown in FIG. 5. If the connection process does not exist for the newly arrived cell a new process is spawned.

After each initialization, the connection process 261 sends the connection establishment cell to a queue in the contention access queue process 264 (CAQ). Here all requests for bandwidth are processed in a first-in-first-out (FIFO) buffer 271 formed in RAM 131. Whenever the CAC 263 decides to transmit it sends the head-of-line packet from the CAQ process 264.

The connection is considered established if the ACK is received before the same slot in the next frame. If the ACK is not received the CAC 263 reinserts (step 272) the connection establishment cell into the CAQ process 264.

When the connection establishment cell is received by the radio unit 14, the CAC at that unit first checks if the connection process already exists for the incoming request (this is possible if there was an intra-burst gap in a connection). If it is a new connection request a new remote process is spawned. The remote process's first action is to send the ACK back to the source. The actual sending of the ACK is delayed to allow for all slot reservations to arrive. This can happen if the source process reserves more than one slot in a frame. Thus, the remote connection process waits one frame period (actually one slot less) before sending the ACK for all reservations. This is done by placing the ACK in the RAQ and waiting for the CAC to send it in the next frame.

Each cell contains a sequence number 253 which enables the connection processes to deliver the data cells to the data layer. When the cells arrive in sequence no queuing is necessary. Whenever an out-of-order cell arrives it is buffered in buffer 273 before the lower sequence number is received. This buffer (queue) is called the out-of-sequence queue (OQ). If a cell in the sequence of cells buffered is not received within a predetermined period, the cell is reconstructed (if possible) from cells stored in the buffer using the error code. If a predetermined number of cells are not received within a predetermined window (of time or of cells), the cells are unrecoverable and the connection process at the receiving end initiates a negative acknowledgement (NACK) to the source unit without further delay. Thus, for example, if 3 out of every 15 cells are recoverable and 4 unrecoverable cells are received in quick succession, a NACK is sent without waiting to receive the rest of the cells in the coded block. During the reception of the message, the receiving process can inform (NACK) the failure to receive individual cells for the purpose of adjustment by the sending unit.

Depending on the type of connection, the frequency of the ACKs sent by the receiving unit can differ. As described above, there is a provision in the SAMA field 251 for explicitly requesting an ACK from the receiving entity. This ACK can be sent either "out-of-band" or in the reserved slots. An explicit ACK can be requested by the sending node when the quality of the connection deteriorates and the cells start accumulating in the OQ buffer 273.

When the cells start accumulating in the RAQ 270 the calling connection processor can issue a request for extra bandwidth. This consists of one or more extra bandwidth request cells send in the contention mode, i.e. through the CAQ process 264. The called connection process responds in the same way as in the case of the connection establishment request, namely by sending an ACK in one of the reserved times (only one ACK is sent as a response to one or more request cells).

Where a NACK is received at the source unit, or if the source unit fails to receive expected ACKs such that it cannot reliably conclude that a block of cells has been received, it retransmits the block of cells. Retransmission upon unsuccessful receipt of acknowledgement can be performed on a cell basis, a block basis or a message basis.

An ACK cell is a potential weakness in the system, because it is not necessarily protected by any additional error code cell and could be lost, for example by colliding with a probe cell from another radio unit. If, following receipt of a block of data cells (or a complete message) at a first radio unit 12 from a second radio unit 14, an ACK cell is transmitted by the first radio unit 12 but it is not received at the second radio unit 14, unit 14 will retransmit the block (or message). This is wasteful if the block has already been received. A special acknowledgement type is created which can be referred to as "acknowledge and decline", which is created by providing a special indicator in SAMA field 251. Each probe cell carries a number which defines a message number. When radio unit 12 receives a probe cell and determines that the message number in SAMA field 251 is the same as the message number of the message just received and acknowledged, radio unit 12 sends a cell with the acknowledge and decline indicator. Upon receipt of this indicator, unit 14 stops transmitting the rest of the message. If unit 12 continues to receive further cells in the sequence, it can send the acknowledge and decline indicator as often as necessary to stop the retransmission. Each radio unit maintains a table of information on other nodes and the last messages received from them.

Thus data cells 242, 243 and error code cells 245 etc. are received at radio unit 12 and error correction is performed by error detect circuit 115 on the data cells 242, 243 using the error code cells. If the data cells are reliably received after error correction, a single ACK cell is sent in return. If a previously-received cell of the series of further cells is again received, processor 130 identifies that the previously-received cell has already been received and first radio unit 12 sends a type identifier (acknowledge and decline) to the second unit 14 indicating that the cell has previously been received. As explained, the step of identifying comprises comparing, in processor 130, a message number in a received cell with a message number of a previously received cell and determining that there is a match. The comparison is preferably performed on the first cell of the new transmission, which will be a probe cell and is identified by the probe cell indicator in SAMA field 251.

All connection processes share a single contention access queue maintained by CAQ process 264. This queue is a FIFO queue where the packets without reserved bandwidth are placed. Each connection process has a reserved access queue (RAQ) 270. The RAQ is a FIFO queue where the connection processes place the data cells which are to be transmitted using the reserved bandwidth.

The functions of the CAC process 263 are: tracking the channel activity and achieving slot synchronization; achieving frame synchronization, where applicable; marking slots as BUSY/IDLE (B/I) and ACCESSIBLE/INACCESSIBLE (A/IA); performing a convergence algorithm; maintaining mapping between the cell locations and the connection processes; and performing initial channel access for the connection establishment cell. This service is offered through the CAQ in the FIFO order. The CAC process 263 also performs bandwidth expansion for an existing connection. This action is treated in the same way as connection establishment and is serviced through the CAQ. In addition the CAC process detects the lack of a cell in the reserved inbound slot. This information can be used by the connection process to send a negative acknowledgement (NAK) to the sender.

The channel time horizon can be considered as divided into slots, each accommodating a single data cell with the necessary synchronization information 230 and trailer 231. The CAC process 263 keeps track of the channel activity in two ways, either by means of channel power sensing and/or by receiving ACKs, but preferably both, as described above.

Frame synchronization means that all participating nodes know when the beginning of the frame is, i.e. they use the same numbering for the slots. Although it is an additional feature, frame synchronization is not necessary for the proper functioning of the protocol.

Figures 6, 7:
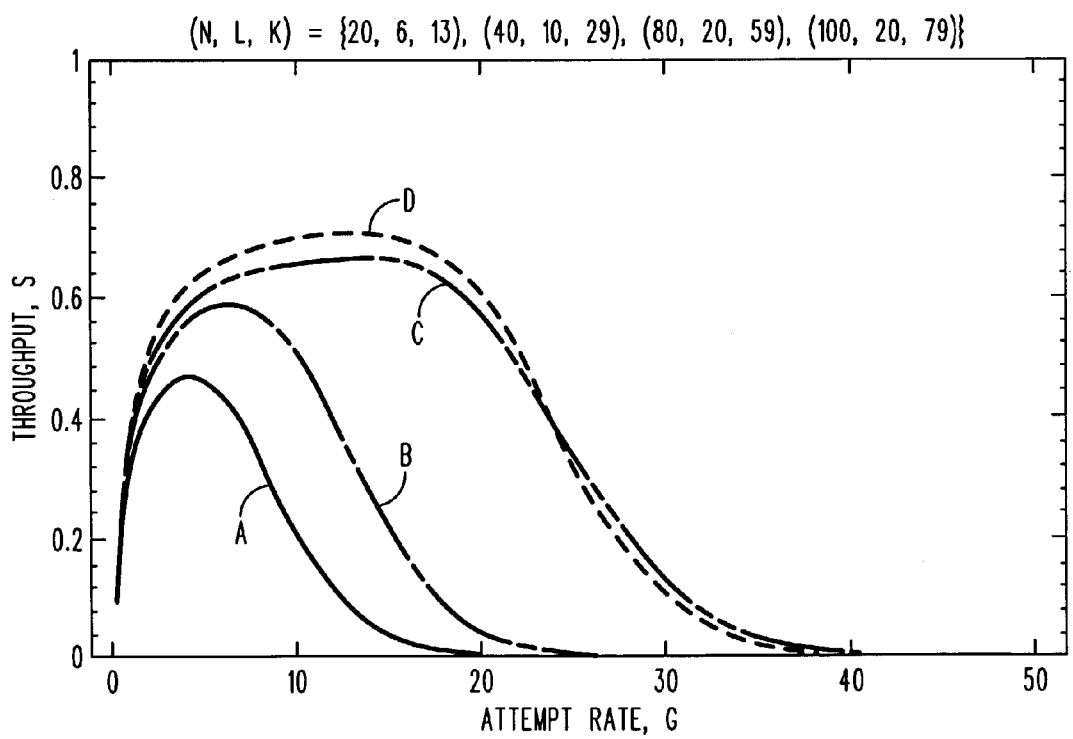
FIG. 6 is a mapping table stored in a memory of the radio unit of FIG. 3.
FIG. 7 is a graph illustrating the performance of the system of the preferred embodiment of the invention with different message sizes.

Marking time locations in a notional frame is an important function of the process performed by processor 130 and for this purpose a table 280, as shown in FIG. 6, is maintained by CAC process 263. FIG. 6 shows the table, which is stored in RAM 131, as having a column for each time location in a frame. For simplicity, table 280 shows the interference state for a single node, however, in the preferred embodiment of the present invention a table is kept for each neighboring node as well. The table shows eight locations in a frame by way of example and more locations are envisaged. Each location represents the start time for a cell. The number of locations in a frame is no fewer than the number of cells that can be accommodated, which is preferably no fewer than 5 and no more than 50. The number of locations in the table is preferably a multiple of the number of cells that can be accommodated in one frame. Thus, for example, if the frame length is equal to 16 cells and the table maintains a record of cell locations with a resolution of ¼ of a cell length, there will be 64 columns in the table.

CACs have a wide range of ways in which they can classify the slots within their frame reference, but certain rules are preferably followed. It is assumed that while the unit is not transmitting it is listening to the channel. Based on the detected power level each slot can be labeled as BUSY (B) or IDLE (I). The threshold level for the decision is adaptable and it can take any value within the measurable range. Any slot in which the node transmits or receives is marked BUSY, e.g. slot numbers 1, 2, 6 and 7 in FIG. 6. Independently, each slot is marked accessible (A) or inaccessible (IA) in the following way. All slots are initially marked accessible. If a slot is accessed it is marked inaccessible (IA). If the ACK is received the slot stays inaccessible until the connection is released and the slot is marked as accessible again. If no ACK is received within specified time, such as one frame period since the end of the initial transmission, the slot is marked inaccessible for the next 30 frames (or for some other number of frames or predetermined time-out value).

Thus, for example, slot 8 shows, based on power level, that it is idle, but it remains inaccessible because an access attempt has been made, no ACK was received and 30 frames have not yet passed since the access attempt. This situation is referred to as a "hidden note" and will arise, for example, when the slot is active at the remote communicating unit (e.g. unit 14) but due to distance, it does not appear to be active at the sending unit, e.g. unit 12. Note also that slot 6 is marked as busy and is accessible. This indicates that no access attempt has been made to that slot in the last 30 frames, but the received signal strength during the slot shows activity. If the activity ceases and the busy/idle status changes, an access attempt can be made to slot 6.

Note that the measuring of power level and the recording in the table 280 of the busy/idle status of the slots are not essential but in some cases can be used to enhance performance. Of greater importance is the recording of the accessible/inaccessible status.

When an ACK for a cell (or cells) of a connection establishment is received, the accessed slot is associated with the connection process that sent the cell (packet). For example in FIG. 5, slot numbers 1 and 2 are associated with connection process 1 and slot number 7 is associated with connection process 2. Thus, when the same slot number in the next frame comes, the CAC process 263 polls the RAQ buffer of the particular connection process (e.g. RAQ 270 of process 261) for any pending packets. If multiple packets are waiting the packet from the head of the queue is fetched. If no packets are present at the time of the polling the CAC process 263 first waits for the end of the slot to see if it is the destination's turn to send a packet. If no packets arrive in the current slot the CAC process 263 assumes the connection is released. It is assumed that the connection process will be notified of this and will send the next packet when it arrives as a connection establishment cell.

Whenever a new connection or a new burst of an existing connection starts, the CAC process 263 sends the connection establishment cell to the remote process. In this way the CAC process 263 reserves the bandwidth for this connection. The CAC process 263 must chose from the set of accessible slots to make the initial transmission. To decide which slots are accessible additional information obtained from channel power sensing can be used. The CAC process visits the accessible slots from table 280 in a cyclic order making a random binary decision to transmit upon each visit. Inaccessible slots are skipped in this procedure. When the random outcome is "1" the CAC process 263 transmits the packet in the current slot. If the random outcome is "0" the next accessible slot is visited.

In the case that the reserved access queue (RAQ) 270 for a specific connection starts to build, the connection access process can initiate a bandwidth expansion request. This request is the same as the regular transmission request placed in the RAQ 270, except that the cell is placed in the buffer 271 of the contention access queue (CAQ) process 264.

The error check number in trailer 246 in the physical layer allows for an internal assessment at the receiver end as to the correctness of received cells. By providing error correcting in the physical layer 220, variable-rate non-binary error-correcting code extending over two or more cells is provided. This allows robustness against cell loss, allowing cells to be recovered, which is particularly useful in view of the new and unique processes described above which allow experimentation as to the accessibility of idle time slots.

This combination of features enables a unit wishing to access the channel to transmit a data cell and wait for an acknowledgement. If the transmitted cell collides with a cell on the channel belonging to another conversation, it will not affect that other conversation because the error coding of that communication is sufficient to recover the lost cell. In the meantime the unit wishing to access the channel will not receive any acknowledgement and will not use that cell location or slot in the next frame period. If an acknowledgement is received, the initiating unit concludes that the time slot is available. Because of the subdividing of the channel by the radio unit into frames, the availability of a slot indicates the availability of the same slot in subsequent frames and the unit can continue to transmit cells in the same slot in subsequent frames. A dedicated acknowledgement for each subsequent cell is not required, as this would be wasteful of the channel resource. Instead the protocol allows for various schemes for acknowledging a string of cells or for including an acknowledgement in a data cell in the return channel.

Thus a system has been described which allows asynchronous access to a radio channel by many different radio units, with many different communications simultaneously interleaved on the channel.

Mathematical modeling shows significant advantages in the scheme described over existing schemes such as slotted ALOHA. Given that a message is coded in such a way that a maximum of L packets (cells) can be lost without losing the whole message and where the number of packets in a coded message is N and the number of information packets is K, such that K+L.ltoreq.N, FIG. 7 illustrates the throughput (S) of the system, as a percentage of total capacity, for four different combinations of N, K and L. In each case an optimum code rate (K/K+L) is used, i.e. the code rate that maximizes the throughput for the selected total message length. In the model, a slotting structure has been applied to the channel for simplicity and, also for simplicity, it is assumed that when a node has a message consisting of many packets, it sends a packet and in the next slot it listens for an ACK. If an ACK is received, the rest of the packets follow immediately in sequence, without applying any frame structure. If no ACK is received, a retry is attempted after a random delay.

The sets of values for the four curves illustrated are:
Curve A: N=20, K=13, L=6
Curve B: N=40, K=29, L=10
Curve C: N=80, K=59, L=20
Curve D: N=100, K=79, L=20

The code rate as defined above is 68%, 74%, 74% and 80% for curves A to D respectively and the code "depth" as defined above (L/N) is 30%, 25%, 25% and 20% respectively.

The model shows that the throughput (S) exhibits a maximum with increase of message arrival rate (G). Larger message sizes (larger values of N) give greater throughput because the proportion of access attempts is lower for a given packet transfer rate. The model shows that throughput rates of 48-70% of total capacity are readily achievable. Similar models for slotted ALOHA show a maximum throughput rate at about 36% of total capacity.

Analysis of everyday use of communications shows that typical voice communication takes place in talk spurts with an average length of 2.5 seconds. One such talk spurt at 64 Kbps would require 417 cells. (The lengths are exponentially distributed; each spurt in the one direction is followed by 2.5 seconds of silence, also exponentially distributed, then by another talk spurt in the other direction.) Typical data usage shows average message lengths of 120 octets (3 cells) uplink (exponentially distributed). Each uplink data message is followed by an unknown period of inactivity (host network response time; typically between 0.5 and 2 seconds), and then by the host response, which contains an average of 5000 octets (104 cells), also exponentially distributed. Of course, these figures are merely examples and different behavior will be exhibited by different types of usage.

It can be seen that the present system as modeled and illustrated in FIG. 7 is highly suited to voice and data communications and that the lengths (average 417 cells and average 104 cells respectively) of talk spurts and data messages can be supported by strings of cells arranged in messages where N is sufficiently large as to reap the benefit of greater throughput. Video communication is predominantly fixed rate, though possibly variable rate and the rate can be negotiated during the progress of a transmission as well as at startup. Video transmissions generally last for many minutes. The present system is also highly suited to supporting video communications.

The wireless data system so far described has many advantages and benefits as explained, but further improvements can be made, for example to address problems that arise if the data network 10 overlaps with another network 11 having packets of a different size.

It is desirable that the order of transmissions on the channel converge in such a fashion that all transmissions occur at regular intervals at the rate chosen for the basic frame rate (or multiples or fractions of that frame rate) and that unoccupied time be concentrated in one contiguous piece. This is illustrated in FIG. 8.

Figure 8:
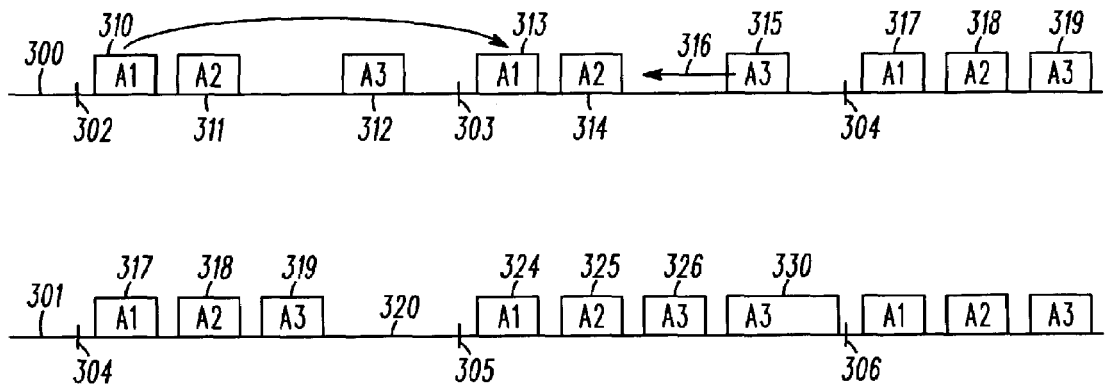
FIG. 8 is a time line diagram illustrating an aspect of operation of the networks of FIG. 1.

FIG. 8 shows a channel 300 continuing as time line 301. Channel 300 is shown as divided in time by frame markers 302, 303 and 304. Time line 301 is divided by frame markers 304, 305 and 306. Channel 300 and time line 301 represent a channel in first and second scenarios. The frame markers do not represent any physical transmission on the channel, but are time markers at regular intervals. It is a feature of a data system that a channel is divided into frames and that the positions of the frame markers need not be synchronized between the receiver and the transmitter, provided that each of the receiver and transmitter operates to the same frame length. The consequence of this is that a receiver is able to identify cells in a sequence belonging to the same virtual circuit because the desired cells are separated in time by an amount equal to the frame length.

In FIG. 8, there are three virtual circuits established, that is to say three pairs of radio units are simultaneously conducting conversations on the channel. In the example, the three pairs of radio units are all from the same network 10 in FIG. 1 (set A). The three virtual circuits are represented by the references A1, A2 and A3 in FIG. 8. The first virtual circuit represented as A1 comprises cell 310 in the frame separated by frame markers 302 and 303 and cell 313 in the frame represented by frame markers 303 and 304. It can be seen that the cell appears in the same position in each frame. Similarly, cell 311 is a cell of the second virtual circuit represented as A2 and cell 314 is the next cell of the same virtual circuit. The illustration is not to scale.

It can be seen that there is a gap between cells 311 and 312. This gap could be used for a cell of a further virtual circuit.

In the example illustrated, there is insufficient room between cells 311 and 312 for a larger cell 19 (FIG. 1) from network 11 to be inserted. It is therefore a feature of the preferred embodiment of the present invention that units communicating on the system adjust the locations of their transmitted cells in a more efficient manner.

In the example illustrated, this is achieved by the unit transmitting cell 315 to cause cell 315 to be transmitted in a position to the left of the illustrated position, as represented by arrow 316. This is done by sending a probe cell in the new location. If an ACK is received, the shift is successful. If no ACK is received, the unit reverts to using the previously occupied location or tries a different location. After successfully shifting the location of its transmitted cell, it can be seen that subsequent cells 317, 318 and 319 are contiguous with no empty locations between them. From the continuation of the time line 301 in the lower half of 355, it can be seen that there is now a gap 320 following cell 319 and before the next cell 324. Another radio unit from network 11 of FIG. 1 (set B) is able to sense this gap and determine that the gap is large enough for the unit (e.g. unit 13), which requires transmission over larger cells, to be inserted in the gap. Accordingly, the next frame, between frame markers 305 and 306 (or at a later time) unit 13 is able to transmit its larger cell 330 in the gap created.

Note that the unit transmitting cell 315 can attempt to shift its cell transmission by a fraction of one cell length at a time, or in units of one cell length at a time as shown.

Thus, an arrangement has been provided which is efficient when there are co-existing networks operating with different cell sizes.

Figure 9:
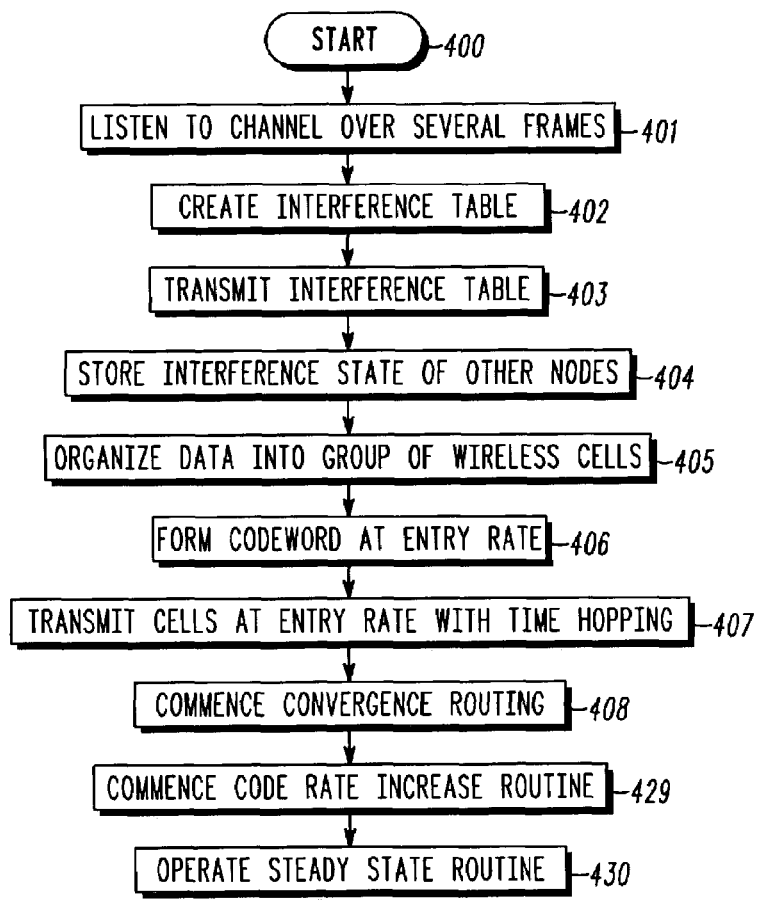
FIG. 9 is a flow diagram illustrating aspects of operation of a computer program performed by the radio unit of FIG. 2.

Assuming now that the channel has stabilized in the state described above, when a new terminal desires to commence communications (e.g. terminal 12 of FIG. 2), it performs the steps illustrated in FIG. 9. It starts a program in microprocessor 130 commencing with step 400. In step 401, it listens to the channel for several frames, optionally utilizing a carrier sensing mechanism, thereby gaining an estimate of the location of the available channel time. At step 402 a table is created and transmitted to local units. As discussed above, this table comprises an interference state of the new terminal. At step 403, the table is broadcast to all local units to inform them of the new unit's interference state. It should be noted that as well as indicating its interference state, the new unit is also receiving and buffering the interference state of all neighboring units to be used when sending a Probe (step 404).

Continuing, the new radio unit organizes its initial data to be transmitted into a group of wireless data cells in step 405. It then, in step 406, forms a code word at the entry rate of transmission, which is a relatively low rate. This entry rate has a high degree of protection against cell loss, by having a high proportion of extra FEC cells 245 in the physical layer 220. The unit 12 then transmits the cells through its transmitter 101 at the desired cell rate, preferably at a rate of one cell per frame. It sends probe cells and selects a different random location (i.e. time) within each successive frame in step 407. In other words, it uses "time hopping" from frame to frame.

Figure 10:
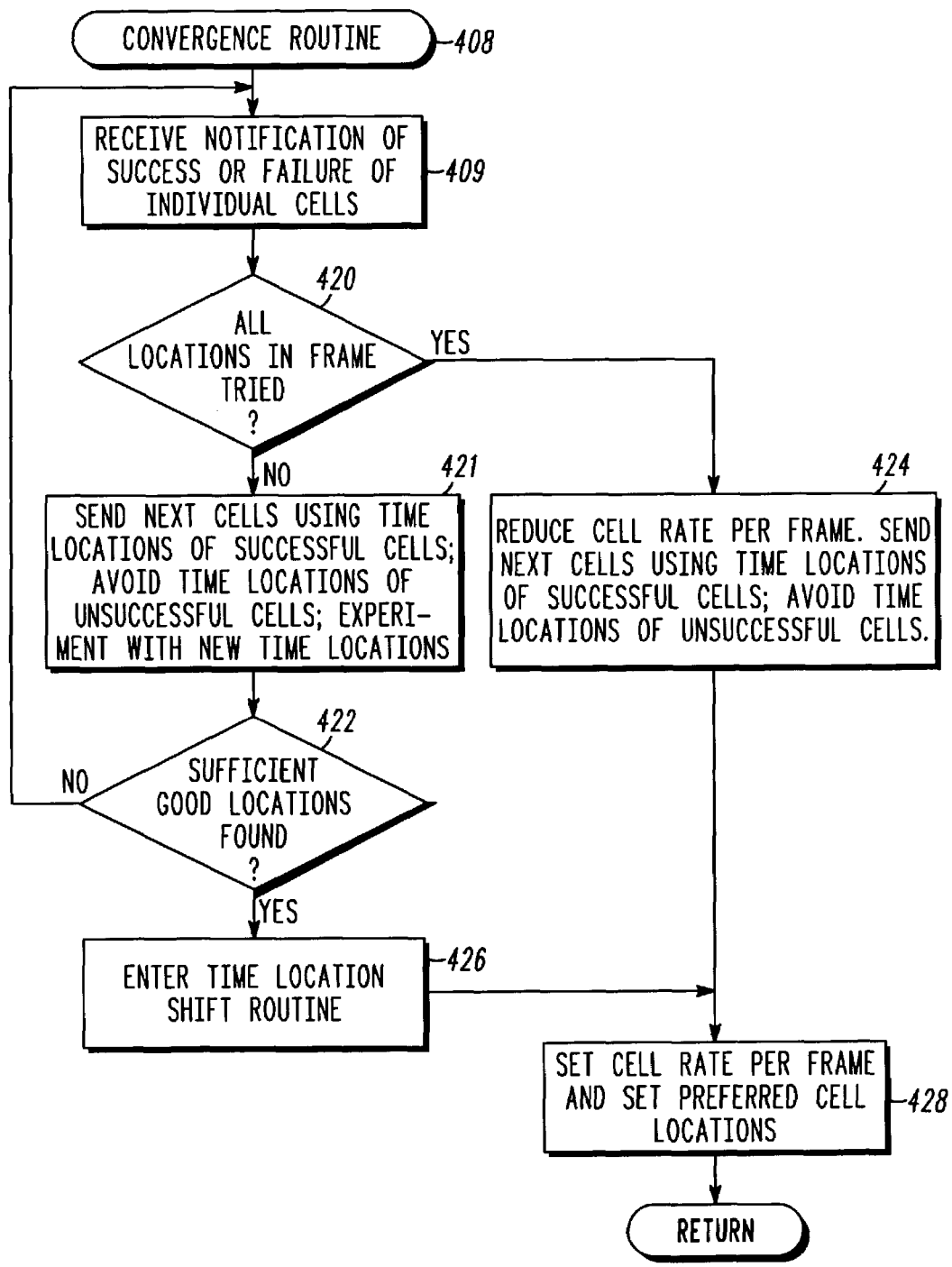
FIG. 10 is a flow diagram illustrating a first sub-routine of the program of FIG. 9.

The program of FIG. 9 enters a convergence sub-routine 408 illustrated in FIG. 10. The radio unit with which unit 12 is communicating (e.g. unit 14) informs radio unit 12 of the success or failure of each individual probe cell. The radio unit 12 receives this notification for individual cells. Due to the high degree of error recovery protection, it can be assumed that lost cells are recovered. In step 420, the program determines whether there are still untried time locations (slots or fractions of slots). Assuming there are still some untried locations, the radio unit sends the next block of cells in step 421 in the same manner as before, this time avoiding those time locations within the frame where the table 280 of FIG. 6 indicates that cells have been lost, or busy cells previously identified by unit 14. Note that other terminals in the area, for example, terminals 15 and 16 of FIG. 1, will not have lost any significant data, as their transmissions are also covered by a degree of error correcting adequate to allow for new uncoordinated traffic such as is being described here.

In step 422, a determination is made as to whether sufficient good locations have been identified in table 280 for communication to continue at the desired rate. Steps 409, 420 and 421 can be repeated until a satisfactory number of good locations have been found. If, before this situation is reached, step 420 determines that all locations in the frame have been tried, the program proceeds to step 424, where the cell rate per frame is reduced and subsequent cells are sent using the time locations of the successful cells, avoiding time locations of unsuccessful cells. If, following step 422, sufficient good locations are found, a time location shift routine illustrated in FIG. 10 is commenced (step 426).

Following the time location shift routine or following step 424, the cell rate per frame is set, the preferred cell locations are set, the program of FIG. 10 returns to FIG. 9 and a code rate increase routine (step 429) and a steady-state routine 430 are carried out.

Figure 11:
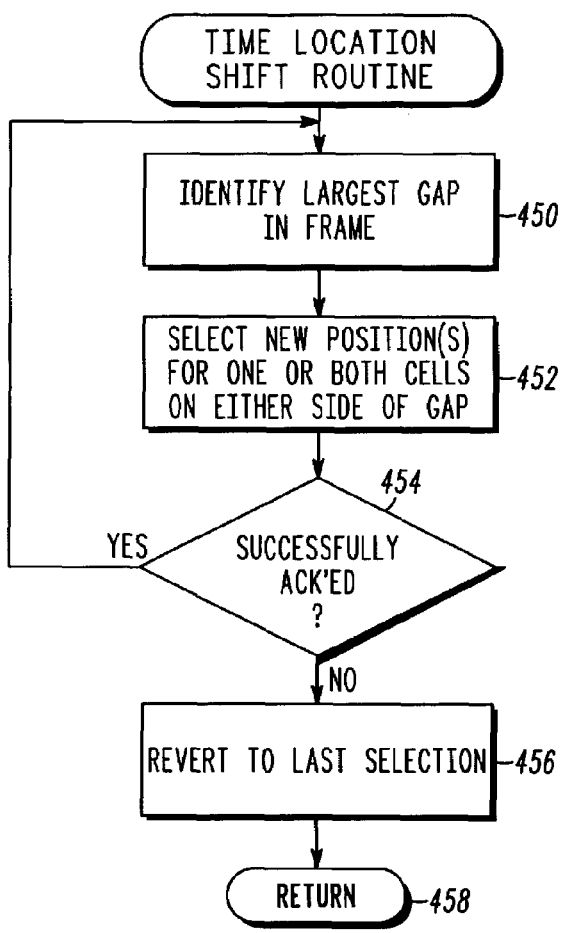
FIG. 11 is a flow diagram illustrating a sub-routine of the program of FIG. 10.

Referring to step 426 of FIG. 10 and referring to FIG. 11, a time location shift routine is illustrated in which step 450 operates by channel sensing to identify the largest gap in the frame, for example, gap 320 illustrated in FIG. 8. Step 452 selects a new position for one or both cells on either side of the gap. In the example illustrated in FIG. 8, it is the unit communicating over virtual circuit A3 that selects a new position for cell 319. It could be arranged that the unit communicating over virtual circuit A2 attempts to move cell 314 to the right in FIG. 8. The direction and amount of a time location shift can be ordered or randomized. If, in step 454 of FIG. 11, there is a successful acknowledgement of the shifted cell, steps 450 and 452 can be repeated. When a time shift attempt is unsuccessful, there is a negative acknowledgement from the communicating unit so that step 454 continues to step 456 and the radio unit reverts to the last selection of time locations for its transmissions.

The algorithm of FIG. 11 uses a combination of channel monitoring and acknowledgements such that the successful busy cells move in time in such a way that the unoccupied channel time is concentrated in one piece. The program returns at step 458 to the point where it exited the program of FIG. 10, that is to say at step 426.

Figure 12:
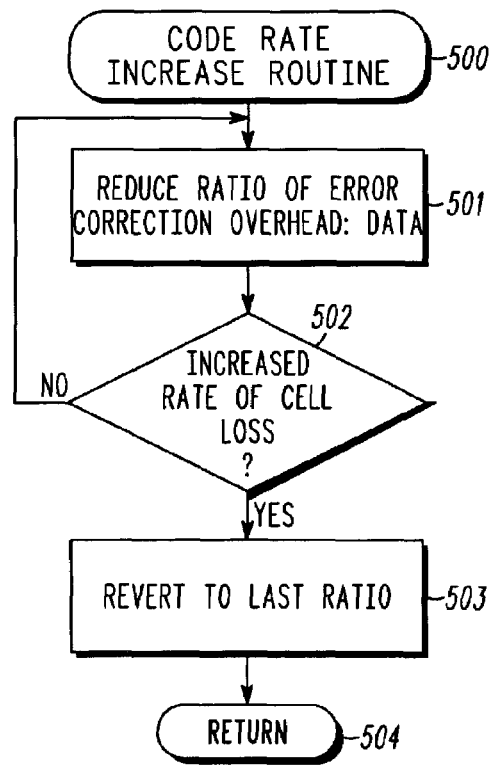
FIG. 12 is a flow diagram illustrating operation of a second sub-routine of the program of FIG. 9.
Figure 13:
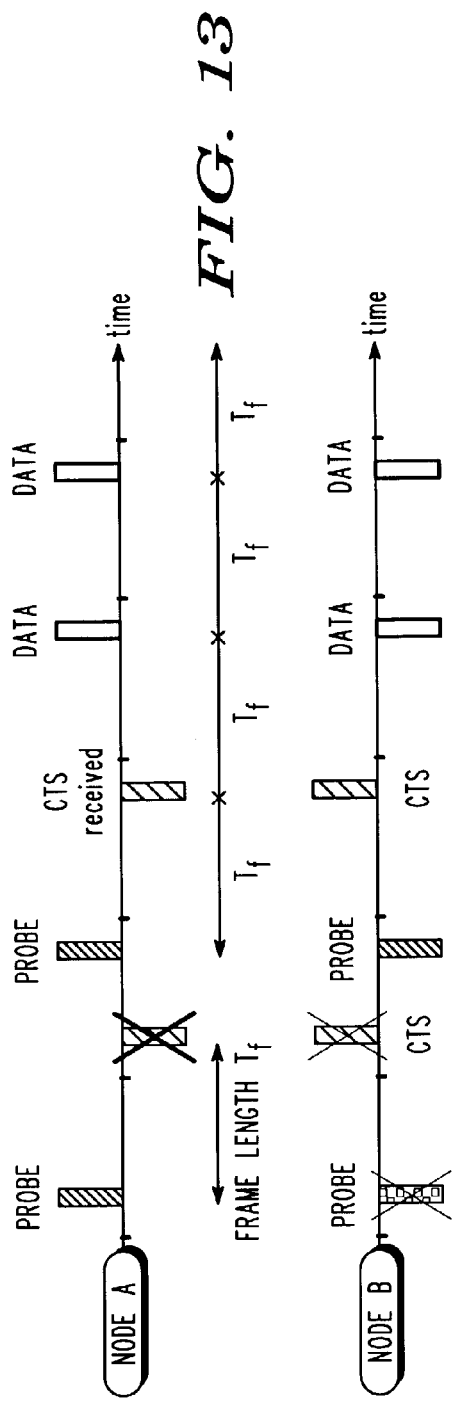
FIG. 13 illustrates prior-art SAMA etiquette.

In the penultimate step of FIG. 9, step 429, a code rate increase routine is performed. A flow chart of this routine is illustrated in FIG. 12. The code rate increase routine starts at step 500. In this routine, step 501 performs the operation of reducing the ratio of error correction code overhead to data. This can be conducted, for example, by decreasing the proportion of FEC coding cells 245 for a given number (block) of data cells 226, 227.

If, in step 502, there is no measured increase in rate of cell loss, the program can return to step 501 and the ratio of error correction overhead can be reduced further. FIG. 12 illustrates that steps 502 and 501 can continue indefinitely until there is an increased rate of cell loss, but it will also be understood that there is a predetermined minimum level of error correction overhead beyond which no further reduction is desired. If, following step 502, there is an increased rate of cell loss, step 503 causes the ratio of error correction overhead to data to be re-established at the last ratio before step 501 was last executed. In step 504, the program returns to the program of FIG. 9 and steady state routine 430 is performed.

Thus, a method is provided wherein first data cells are sent from the first unit 12 to a second unit 14 and for a predetermined number of first data cells 226, 227 sent (e.g. 15 or 18), additionally a first number of error code cells 245 are sent (e.g. three). Control information is received from the second unit 14 (in SAMA field 251) indicative of successful receipt of the first data cells. Second data cells are sent (not shown in the figures), and for the same predetermined number of second data cells (e.g. also 15 or 18) a second reduced number of error code cells are sent (e.g. two error code cells). Alternatively for the same total block length a greater proportion of data cells are sent.

A corresponding error code rate decrease routine is provided similar to that of FIG. 12, this time initiated by NACKs received from the communicating unit or initiated by the absence of ACKs. The routine comprises, at the first unit 12: receiving control information (in SAMA field 251) from the second unit 14 indicative of unsuccessful receipt of the second data cells; sending third data cells; and sending, for the same predetermined number of third data cells, a third number of error code cells (e.g. three error code cells) greater than the second reduced number. Alternatively for the same total block length a greater proportion of error code cells are sent.

In the steady state routine 430, frame locations (slots) are visited in a cyclic order and permission to transmit, i.e. probe, for accessibility in a given location is obtained through a random binary decision. The probability of obtaining permission in a given location is no greater than a predetermined probability value. After a location is accessed and no ACK is received, the location is marked inaccessible in the table of FIG. 6.

Radio units entering a stable state are expected to act to maximize the size of the largest available time segment by moving towards one end of the basic frame. To sense their approach to other transmitting units, they introduce a small (small fraction of a cell) variation in each cell transmission time, stopping their progression when a cell at the extreme variation is lost.

Note that the arrangement described has the advantage that it is not necessary to decode signals from other units on the channel in order to probe for channel availability, nor is it even necessary to sense activity on the channel. An attempt at probing for a location for transmission of a cell causes interference to other users in isolated cells, which are recoverable. The originator of a circuit set-up makes the decision as to whether an ACK is received or not and therefore whether the sought-after channel capacity is available.

Figure 14:
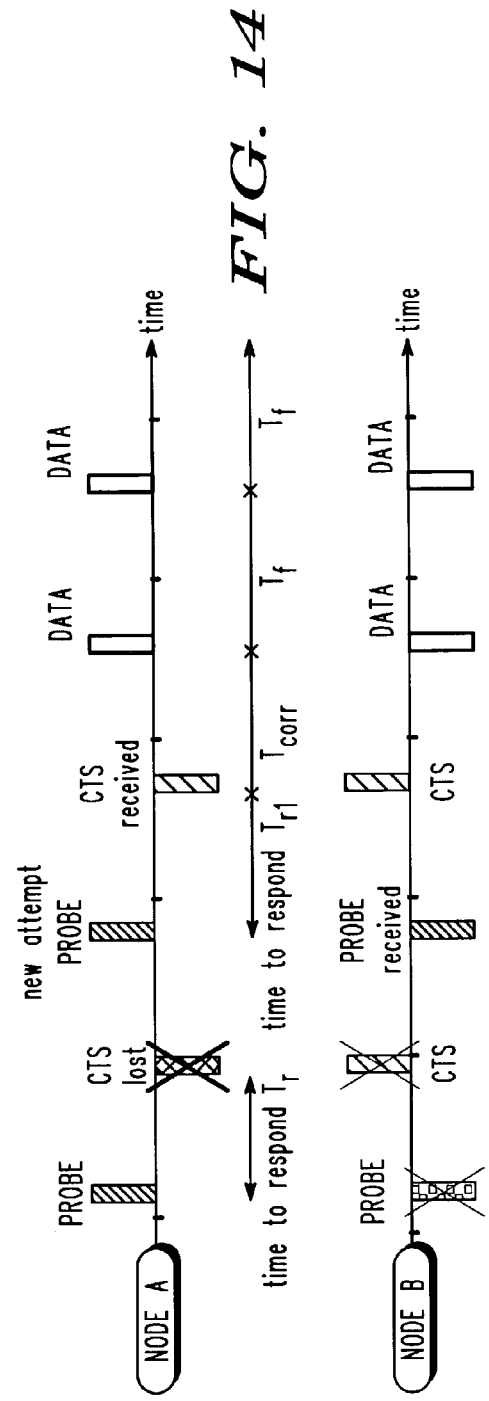
FIG. 14 illustrates SAMA etiquette in accordance with the preferred embodiment of the present invention.

It should be noted that in alternate embodiments of the present invention, actual time slots for un-interfered-with reception need not be given. Instead a simple time period for desired reception may be broadcast to local nodes. FIG. 14 illustrates this. As before, the first packet in a burst is referred to as the Probe packet. Node A determines an optimal broadcast time for broadcasting to Node B. This is accomplished by listening for an interval of at least one frame, and identifying a period of low activity (transmitted from Node B). During the period of low activity an optimal time for receiving by Node A is encloses in the Probe the map. In this case the most optimal time was $T_r$ after the Probe was sent. If the node B receives Probe successfully, it will reply by sending a CTS (clear-to-send) packet exactly $T_r$ after it started receiving the Probe packet. It will also update its table by entering the new interference profile for Node A. This CTS message will include another map that identifies optimum time to send data packets to the node B (in this case the offset $T_{corr}$ is the most optimal time) as well as the power control information indicating to the transmitter whether it should increment the power used for the Probe message; these data packets will now be transmitted in regular intervals $T_f$. Additionally, Node A after receiving CTS message will update the interference profile for Node B in its table and use the power control information to send the data messages.

This protocol will also enable the nodes A and B to set up duplex connection if necessary and also compensate for changes in the channel as observed by the two nodes. This protocol does not violate dominant quasi-periodic character of SAMA, as the data transfer phase is the same as in the basic etiquette, but should result in better overall performance of the aggregate of communicating devices using the channel.

Figure 15:
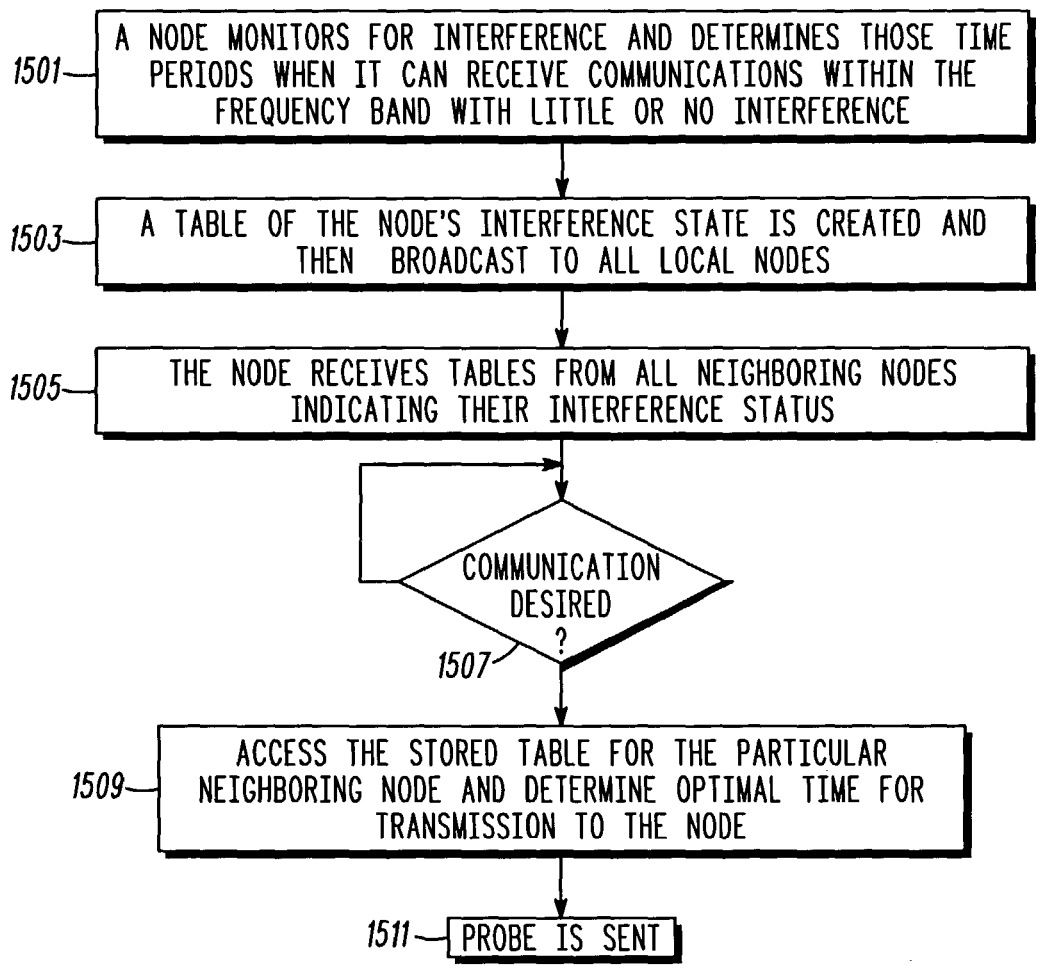
FIG. 15 is a flow chart showing the operation of the communication system described in FIG. 14.

FIG. 15 is a flow chart showing the operation of the communication system described in FIG. 14. As discussed above, each unit/node within the communication system operates within the same frequency band. Communication from one node to another node takes place by transmitting during a predetermined time period, and then continuing transmissions periodically after a predetermined period of time. The logic flow begins at step 1501 where a node monitors an interference state and determines those time periods when it can receive communications within the frequency band with little or no interference. This is preferably done via processor 130 monitoring RSSI 112 from receiver 102. In particular, the frequency band is monitored to determine a time period where little or no activity occurs within the frequency band. At step 1503 a table of the node's interference state is created by processor 130, stored in RAM 131 and then broadcast to all local nodes. As discussed above, the table may comprise a table of available slots where interference and/or no interference occurs, or may simply identify optimal and/or sub-optimal time periods for reception.

Continuing, at step 1505, the node receives (via over-the-air communication) tables from all neighboring nodes indicating their interference status. As discussed above, the interference status may comprise a table comprising available slots where interference and/or no interference occurs or may comprise table comprising optimal and/or sub-optimal time periods for reception. Additionally, it should be noted that neighboring nodes can refer to any type of communications device such as a base station, subscriber unit, or other communications receiver or transmitter. At step 1507 the node determines if communication is desired with any neighboring node, and if not the logic flow simply returns to step 1507. However, if communication is desired, the logic flow continues to step 1509 where the node accesses the stored table for the particular neighboring node and determines an optimal time for transmission to the node. This is accomplished by utilizing the table received from the neighboring node and determining the neighboring node's optimal times for reception. Finally, at step 1511 a Probe is sent to the neighboring node during the optimal time period, and the access procedure takes place as described above and information is transmitted to the neighboring node.

While the invention has been particularly shown and described with reference to a particular embodiment, it will be understood by those skilled in the art that various changes in form and details may be made therein without departing from the spirit and scope of the invention. It is intended that such changes come within the scope of the following claims.

The invention claimed is:

1. A method for transmitting information within a communication system, the communication system comprising a plurality of nodes communicating within a same frequency band, the method comprising the steps of:
    monitoring for interference to determine an interference state comprising those time periods when a node can receive communications within the frequency band with little or no interference;
    creating a table of the node's interference state and both optimal and suboptimal time periods for reception within the frequency band wherein the optimal and sub-optimal time periods for reception varies according the node's interference state;
    broadcasting the node's interference state to a plurality of neighboring nodes within the communication system;
    receiving a second table from at least one of the plurality of neighboring nodes, the second table being broadcast by the neighbor node to other nodes in the communication system, the second table comprising an interference state and both the optimal and sub-optimal time periods for reception within the frequency band for the neighboring node;
    determining, from the second table, a time to transmit to the neighboring node wherein the time can be selected from one of the optimal time and the suboptimal time periods for reception within the frequency band obtained from the second table; and
    transmitting information to the neighboring node during the determined time period.

2. The method of claim 1 wherein the step of monitoring for interference comprises the step of:
    monitoring the frequency band to determine a time period where little or no activity occurs within the frequency band.

3. The method of claim 1 wherein the step of creating the table comprises the step of:
    creating a table comprising available slots where interference and/or no interference occurs.

4. The method of claim 1 wherein the step of broadcasting the node's interference state comprises the step of broadcasting via over-the-air communication, the node's interference state.

5. The method of claim 1 wherein the step of receiving the second table comprises the step of:
    receiving a table comprising available slots where interference and/or no interference occurs.

6. The method of claim 1 wherein the step of receiving the second table comprises the step of:
    receiving a table comprising optimal and/or sub-optimal time periods for reception.

7. The method of claim 1 wherein the step of transmitting information comprises the step of transmitting information within the frequency band.

8. The method of claim 1 wherein the table further comprises power control information.

9. The method of claim 1 further comprising updating the table by entering updated interference states and updated optimal and/or sub-optimal time periods.

10. An apparatus comprising:
    a processor monitoring for interference within a frequency band and outputting a table comprising an interference state and both optimal and suboptimal time periods within the frequency band for reception wherein the optimal and suboptimal time periods within the frequency band for reception varies according the node's interference state;
    memory for storing the table;
    a transmitter, for transmitting the table to a plurality of neighboring nodes within a communication system; and
    a receiver, receiving a second table from at least one of the neighboring nodes, the neighboring node broadcasting the second table to other nodes in the communication system, the second table comprising an interference state and both the optimal and sub-optimal time periods within the frequency band of reception for the neighboring node, wherein the second table is additionally stored within the memory, and
    wherein the processor determines a time to transmit to one of the neighboring nodes from selected from among the optimal and suboptimal time periods within the frequency band obtained from the second table.

11. The apparatus of claim 10 wherein the table comprises available slots where interference and/or no interference occurs.

12. The apparatus of claim 10 wherein the table further comprises power control information.

13. The apparatus of claim 10 wherein the processor continues monitoring for interference to output the table with updated interference states and optional and/or sub-optimal time periods.

* * * * *